(12) United States Patent
Gill

(10) Patent No.: US 7,296,587 B2
(45) Date of Patent: Nov. 20, 2007

(54) SELF-EXTRACTING SERVICE MODULE FOR PIPING INFRASTRUCTURES

(76) Inventor: Richard Taylor Gill, 2020 Saddle Drive, Nanoose Bay, British Columbia (CA) V9P 9C2

( * ) Notice: Subject to any disclaimer, the term of this patent is extended or adjusted under 35 U.S.C. 154(b) by 321 days.

(21) Appl. No.: 11/165,370

(22) Filed: Jun. 24, 2005

(65) Prior Publication Data

US 2006/0289063 A1 Dec. 28, 2006

(51) Int. Cl.
*F17D 1/00* (2006.01)
*F16K 43/00* (2006.01)

(52) U.S. Cl. .............................. 137/315.01; 137/315.41

(58) Field of Classification Search .......... 137/315.01, 137/315.41
See application file for complete search history.

(56) References Cited

U.S. PATENT DOCUMENTS

| | | | |
|---|---|---|---|
| 4,822,213 A | 4/1989 | Grace et al. ................. | 405/303 |
| 5,038,817 A | 8/1991 | Henry et al. ................. | 137/315 |
| 5,437,480 A | 8/1995 | Weil ............................ | 285/167 |
| 5,529,087 A * | 6/1996 | Berry et al. ............ | 137/315.41 |
| 5,820,166 A | 10/1998 | Webb .......................... | 285/23 |
| 5,868,442 A | 2/1999 | Lin ............................. | 285/367 |
| 5,873,611 A | 2/1999 | Munley et al. ............. | 285/367 |
| 6,109,662 A | 8/2000 | van Zuthem et al. ..... | 285/146.2 |
| 6,186,164 B1 * | 2/2001 | Pfeifer et al. ........... | 137/315.41 |
| 6,209,443 B1 | 4/2001 | Perez ............................ | 92/39 |
| 6,467,814 B1 | 10/2002 | Wivagg ..................... | 285/205 |

OTHER PUBLICATIONS

U.S. Appl. No. 10/926,328, filed Aug. 26, 2004, Tadros.

* cited by examiner

*Primary Examiner*—Kevin Lee
(74) *Attorney, Agent, or Firm*—Fasken Martineau Dumoulin LLP

(57) ABSTRACT

A self-extracting service module for piping infrastructures comprises a platform on which is mounted equipment for controlling and or monitoring the flow of liquid or gaseous media throughout the piping infrastructures. A first remote-controllable pipe coupling system is interconnected with the equipment inlet and a second pipe coupling system is interconnected to the equipment outlet. The pipe coupling systems are remotely manipulable for engaging and disengaging the equipment with piping infrastructure inlets and outlets. The platform is attached to actuators positioned near each corner of the platform. The service module is extracted from the piping infrastructure by first isolating the equipment from the flow of liquid media after which, the pipe coupling systems are remotely disengaged from the piping infrastructure inlet and outlet. The actuators are then operated to move the platform from within the piping infrastructure to a position where service work is easily performed on the equipment.

44 Claims, 7 Drawing Sheets

SELF-EXTRACTING SERVICE MODULE FOR PIPING INFRASTRUCTURES

FIELD OF THE INVENTION

This invention relates to self-extracting service modules for piping infrastructures. More particularly, this invention relates to service modules containing equipment for regulating and/or monitoring the flow of liquid or gaseous media through piping infrastructures.

BACKGROUND OF THE INVENTION

Complex and extensive piping infrastructure systems are commonly used for high-volume transport of liquid media and gases over extended distances and multiple changes of elevation in various municipal and industrial applications. Examples of such piping infrastructures include public works for distribution of water to and within residential and industrial communities, collection, treatment and disposal of residential and industrial waste streams, movement of raw materials, reagents, products and waste streams within pulp and paper mills, transfer of crude oil and resulting petroleum products within refineries, and transport of natural gas. Reliable and efficient transport of liquid media and gases in such systems requires a plurality of strategically located pressure-regulating and monitoring service stations throughout the piping infrastructures to constantly maintain and control pressures applied to ensure target flow rates are maintained. Depending on the type of liquid material or gases being transported and on location within the piping infrastructure, a service module provided at a service station may contain one or more pieces of pressure-regulating and/or monitoring equipment such as single- or double-port main valves, pressure-reducing valves, pressure-relief and check valves, pumps, pump control valves, flow meters, and the like.

In most municipal water supply and waste disposal systems, the attendant piping infrastructure is buried underground and therefore the pressure-regulating and monitoring service stations are typically situated below ground within buried or subterranean concrete vaults. The walls of the vaults are provided with integrally installed inlets and outlets for engaging the piping infrastructure. The inlets and outlets are coupled to the requisite equipment installed within the vaults. Each service station is provided with bypass lines to enable shutdown and routine servicing of the equipment or, alternatively, replacement of failed or obsolete equipment. Such stations i.e., underground concrete vaults, are made just large enough to house the requisite equipment, one or two bypass lines and to provide the necessary minimal space for one or two workers to enter the station and perform the necessary service work. Access is typically provided through vertical openings provided in the tops of such vaults. The openings are commonly referred to as manholes, and are just large enough for a service worker to fit through. Such concrete vault service stations can be constructed on-site, that is by first constructing the vault by pouring the concrete walls and floor, the piping infrastructure inlet and outlet are integrally cast into the vault walls when the concrete is being poured, then installing the requisite equipment and bypass lines(s), and finally, connecting the service station into the flow of liquid media contained within the piping infrastructure. Alternatively, subterranean concrete vaults can be pre-cast and partially configured with equipment off-site, then trucked to their installation location within the piping infrastructure wherein they are installed and their construction and configuration is completed. Because of the interior space required for access and service work, such vaults are typically very heavy, e.g., 20,000-55,000 lbs (9,000-25,000 kg), they are commonly cast in two pieces and require heavy-duty specialized cranes, excavators and personnel for their handling and installation.

Federal and regional government agencies have designated such service stations, e.g., buried concrete vaults, as "confined spaces" wherein workers may encounter atmospheric hazards such as lack of oxygen or the presence of toxic vapours, and/or physical hazards such as electrical shock, mechanical malfunctions, or entrapment/engulfment by liquids or solids. "Confined spaces" are defined as spaces that are large enough for a person to enter through manhole or hatch covers, have limited means of entry or egress, and are not designed for extended human occupancy. Examples of such service stations include pumping stations, meter stations and valve stations. Entry into and service work inside "confined space" stations are strictly regulated under occupational safety legislation to ensure worker safety and rapid exit in case of emergencies.

SUMMARY OF THE INVENTION

It is an object of the present invention, at least in preferred forms, to provide a self-extracting service module containing thereon equipment for regulating and/or monitoring the flow of liquid or gaseous media being transported throughout piping infrastructures. The service module is provided with actuators for moving the module into and out of confined spaces in piping infrastructures, and also is provided with remote-controllable pipe coupling systems for engaging and disengaging the equipment configuration with the piping infrastructure. The self-extracting service module of the present invention enables controllable removal of pressure-regulating and/or monitoring equipment from a confined space within a piping infrastructure to a location where service work can be easily performed without the attendant hazards and constrictions associated with confined spaces.

According to one aspect of the present invention, there is provided a self-extracting service module having a platform for mounting thereon equipment for regulating and/or monitoring the flow of liquid or gaseous media within a piping infrastructure. The equipment may comprise one piece of equipment or alternatively, two more pieces of interconnected equipment such as single- or double-port main valves, pressure-reducing valves, pressure-relief and check valves, strainers, pumps, pump control valves, and flow meters. The equipment is interconnected at its inlet and outlet ends to remote-controllable pipe coupling systems provided for engaging and disengaging the equipment to and from piping infrastructure inlets and outlets. The platform is attached to actuators which are controllable to move the platform into and from within piping infrastructure. The actuators may be controlled by hydraulic, pneumatic or mechanical systems. The actuators are mountable into or onto substructure supports for the piping infrastructure.

According to another aspect of the present invention, there is provided a self-extracting service module having remote-controllable pipe coupling systems interconnected with the inlet and outlet of equipment mounted thereon, wherein each pipe coupling system comprises a collar portion having an outside diameter matching the outside diameter of the piping infrastructure inlet or outlet, and a slidable compressible sleeve portion superposed over the collar portion when in the disengaged position. The collar portion may be provided with an integral guide for sliding the compressible sleeve therealong. The sleeve portion is remotely manipulable to slidingly superpose a portion of a piping infrastructure inlet and the collar portion, and after which it is sealingly compressed onto the inlet and the collar portion.

In a preferred form, the invention provides a self-extracting service module for piping infrastructures, wherein the platform is attached to a plurality of actuators (preferably hydraulically operated), each actuator positioned near a corner of the platform whereby the weight of the platform and the pressure-regulating/monitoring system is distributed preferably equally among the plurality of actuators. Each actuator preferably comprises a flexible expandable bladder contained within a rigid frame having a movable member extending therein, whereby supplying a hydraulic pressure to the bladder will cause the bladder to expand axially against the movable member thereby extending the member from a resting position within the rigid frame along a linear axis, while releasing hydraulic pressure within the bladder will cause it to progressively collapse thereby allowing the movable member to retract within the rigid frame back to the resting position.

In another preferred form, the invention provides a service module platform attached to a plurality of actuators mounted at the bottom of a concrete vault wherein the platform is in a raised position when the actuators are pressurised, and in lowered position when the actuators are depressurised.

In an alternative preferred form, the invention provides a service module platform attached to a plurality of double-acting actuators mounted horizontally onto or into a supporting substructure of a piping infrastructure wherein the platform moves along a horizontal axis when a first side of the actuators is pressurised while the opposite side is depressurized, and retracts along the horizontal axis when the opposite side of actuators is pressurised and the first side is depressurised.

In another preferred form, the invention provides a service module attached to two sets of matched actuators mounted horizontally onto or into a supporting substructure of a piping infrastructure wherein the platform moves along a horizontal axis when a first set of actuators is pressurised while the second set is depressurized, and retracts along the horizontal axis when the second set of actuators is pressurised and the first set is depressurised.

According to another aspect of the present invention, there is provided a self-contained service station unit for sub-surface installation within subterranean piping infrastructures. The service station unit may be a concrete vault. The service station unit is provided with a piping infrastructure inlet and an outlet integrally fixed into and therethrough its walls for interconnecting with the subterranean piping infrastructure. The service station unit is provided with a self-extracting service module having a supporting structure such as a platform for mounting thereon equipment for regulating and/or monitoring the flow of liquid or gaseous media within the piping infrastructure. The equipment may be one piece or alternatively, two or more pieces of interconnected pressure-regulating or monitoring equipment such as single- or double-port main valves, pressure-reducing valves, pressure-relief and check valves, strainers, pumps, pump control valves, and flow meters. The equipment is interconnected at its inlet and outlet ends to remote-controllable pipe coupling systems provided for engaging and disengaging the equipment configuration to and from piping infrastructure inlets and outlets. Each pipe coupling system comprises a collar portion having an outside diameter matching the outside diameter of the piping infrastructure inlet or outlet, and a slidable compressible sleeve portion superposed over the collar portion when in the disengaged position. The collar portion may be provided with an integral guide for sliding the compressible sleeve therealong. The sleeve portion is remotely manipulable to slidingly superpose a portion of a piping infrastructure inlet and the collar portion, and after which it is sealingly compressed onto the inlet and the collar portion. The service module platform is attached to a plurality of interconnected actuators mounted at the bottom of the service station unit wherein the platform is in a raised position when the actuators are pressurised, and in lowered position with the actuators are depressurised. An actuator is preferably positioned near each corner of the platform whereby the weight of the platform and the equipment configuration mounted thereon is distributed among the plurality of actuators. Each actuator comprises a flexible expandable bladder contained within a rigid frame having a movable member extending therein, whereby supplying a hydraulic pressure to the bladder will cause the bladder to expand axially against the movable member thereby extending the member from a resting position within the rigid frame along a linear axis, while releasing hydraulic pressure within the bladder will cause it to progressively collapse thereby allowing the movable member to retract within the rigid frame back to the resting position. The hydraulic pressure to the actuators may be supplied by a feed line tapped into the piping infrastructure or alternatively, by a self-contained hydraulic pump and reservoir system.

BRIEF DESCRIPTION OF THE DRAWINGS

The present invention will be described in conjunction with reference to the following drawing, in which.

DETAILED DESCRIPTION OF THE INVENTION

Figure 1:
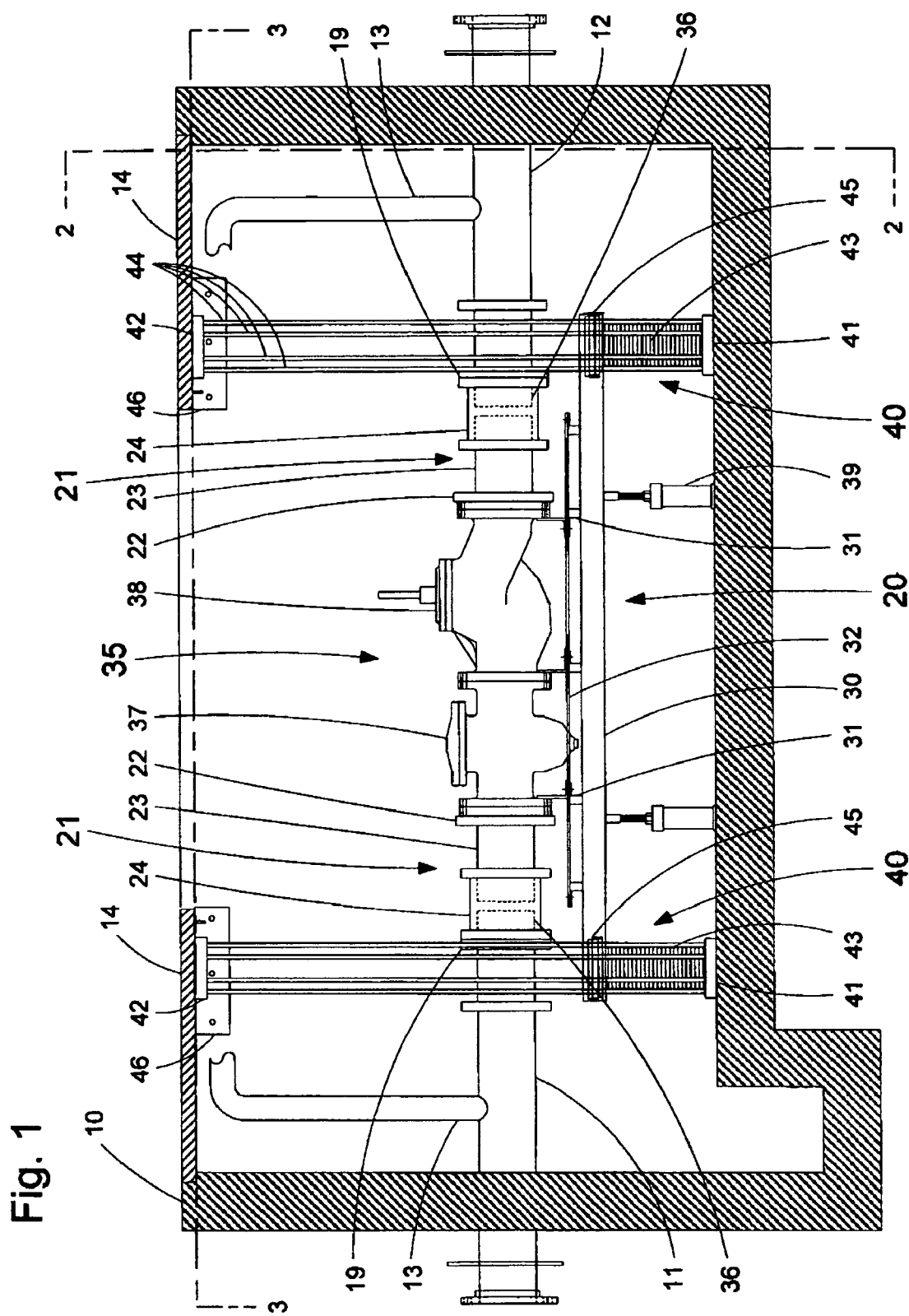
FIG. 1 is a side view of one embodiment of the present invention shown engaged with a piping infrastructure.

The present invention provides a self-extracting service module which is mountable within a piping infrastructure service station wherein various types of pressure-regulating and/or monitoring equipment are required for controlling the flow of liquid or gaseous media through the piping infrastructure, e.g., within buried underground concrete vaults interconnected with underground municipal water lines, sewer lines, and natural gas lines. The service module comprises a supporting structure providing a platform for mounting thereon equipment for regulating and/or monitoring the flow of media therethrough, the platform being securely attachable to a plurality of actuators mountable into the piping infrastructure service station for raising and lowering the platform within the service station, and a remote pipe coupling system for detachably engaging the equipment with the piping infrastructure inlet and outlet coming into the piping infrastructure service station. When used with a buried concrete vault, the type, size and configuration of the actuators should enable sufficient displacement to raise the platform from within the vault to an easily accessible surface ground level. Suitable actuators include those operated by hydraulic pressure or pneumatic pressure or mechanical pressure. However, hydraulic actuators are preferable. The hydraulic actuators may be operable by upstream line pressure from the piping infrastructure or alternatively by a stand-alone hydraulic pump/reservoir system, to increase and decrease hydraulic pressure within the actuators thereby affecting the raising and lowering of the service module platform. Engagement and disengagement of the piping infrastructure outlet and inlet are accomplished by controllably operating the remote pipe coupling systems interconnected with the inlet and the outlet of the equipment mounted on the service module platform. After the self-extracting service module is installed in the service station and engaged with the piping infrastructure, then the open top vault is sealed in accordance with regulatory requirements with a hinged hatch or alternatively, a removable cover plate overlying the service module platform along with tread plates covering the open top on either side of the cover plate.

When routine service or replacement work on the pressure regulating/monitoring equipment is required, the cover plate for the service station is removed or opened, after which the equipment on the service module is isolated from the media flow, and then disengaged from the piping infrastructure by remotely manipulating the remote pipe coupling systems to separate the equipment from the piping infrastructure inlet and outlet, and then pressuring the actuators to raise the service module platform to ground level thereby extracting the service module platform from within the concrete vault. The equipment mounted on the service module can then be easily accessed and serviced. After service has been completed, the pressure within the activators is controllably reduced thereby allowing the combined weight of the service module platform and the equipment mounted thereon to lower the module back down into the vault, after which the pressure-regulating/monitoring system is reconnected to the piping infrastructure by remotely manipulating the remote pipe coupling systems to sealably engage the equipment configuration with the piping infrastructure. If so required by the design and configuration of the piping infrastructure, the self-extracting service module of the present invention may be used in an above- or below-ground service station wherein the activators are mounted to the service station in a horizontal plane thereby providing lateral access and egress into piping infrastructure.

The present invention also provides a self-contained service station unit for sub-surface installation within subterranean piping infrastructures, comprising a concrete vault wherein is mounted a self-extracting service module provided with equipment mounted thereon for regulating and/or monitoring the flow of liquid or gaseous media therethrough the piping infrastructure.

Figure 2:
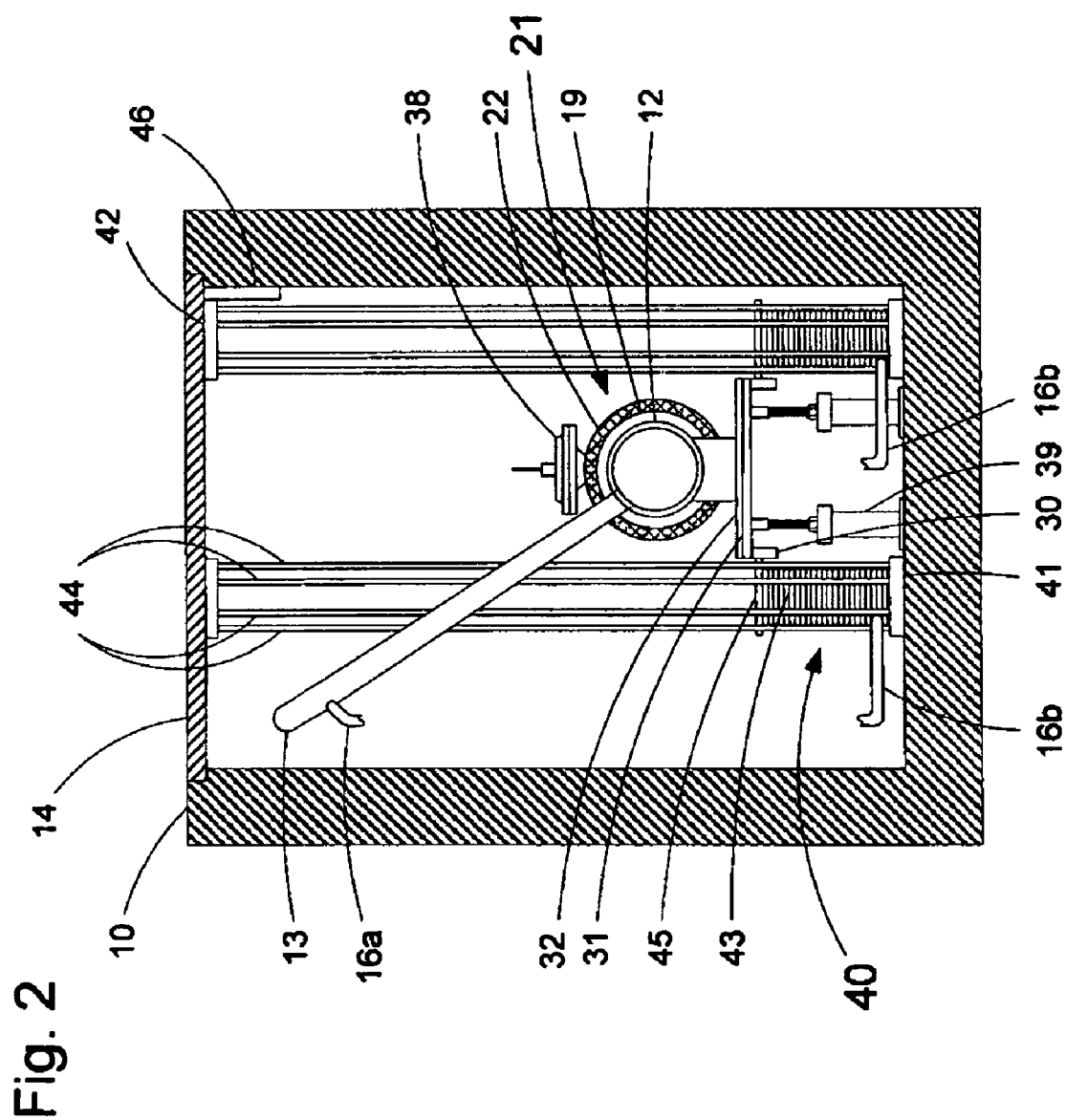
FIG. 2 is a sectional end view of the embodiment shown in FIG. 1.
Figure 3:
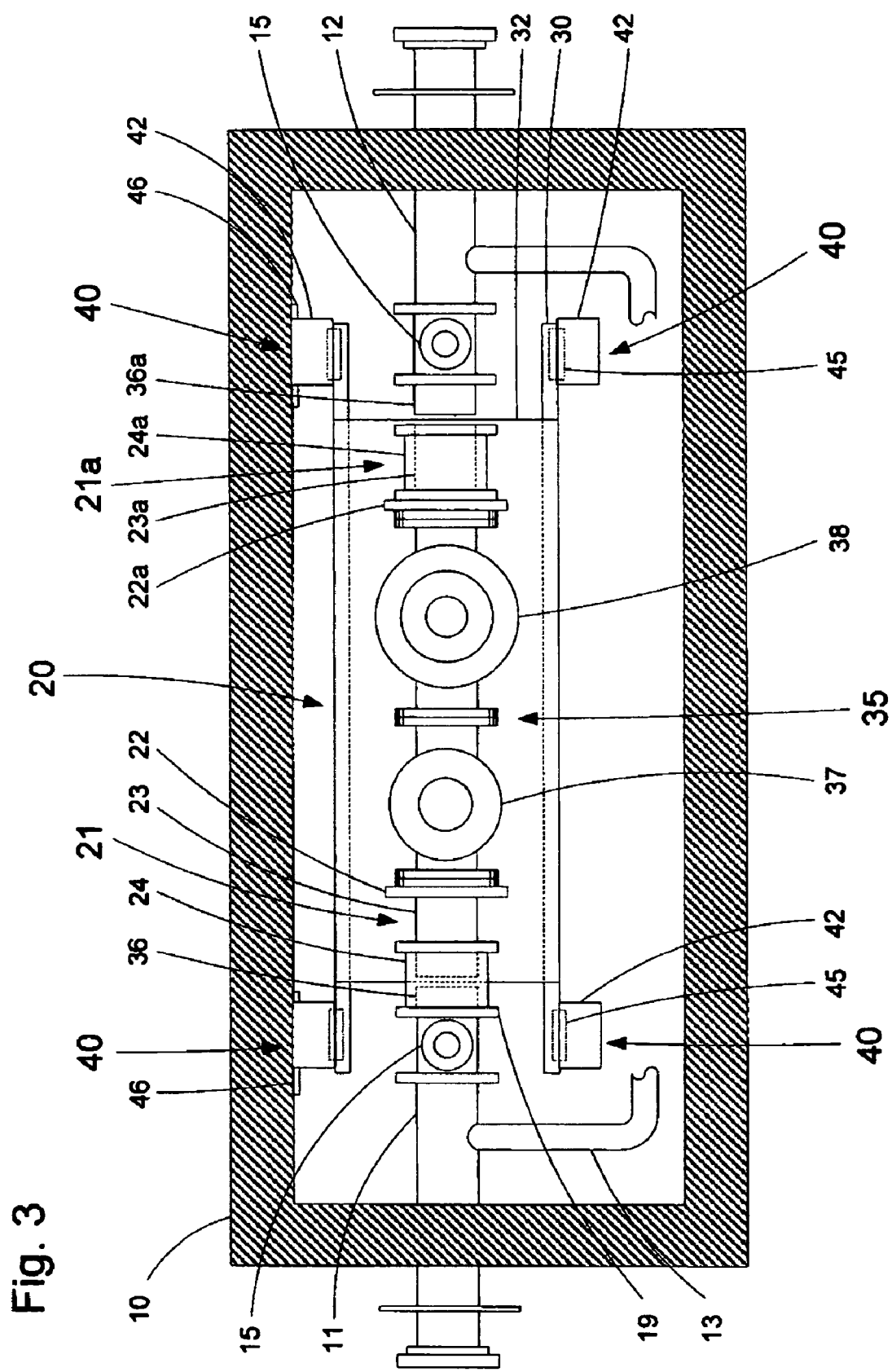
FIG. 3 is a sectional plan view of the embodiment shown in FIG. 1.

An example of a preferred embodiment of the present invention is shown in FIGS. 1, 2, and 3 comprising a self-extracting service module 20 installed within concrete vault 10 and engaged with a piping infrastructure inlet 11 and a piping infrastructure outlet 12. The self-extracting service module 20 comprises:

(a) a platform 32 mounted on a plurality of supporting crossmembers 31 integrally supported by opposing frame rails 30, for installing thereon platform 32, equipment 35 which in this case comprises a pressure-relief valve 38 connected to a main strainer 37, (b) a first and a second remote pipe coupling system 21 for remotely engaging and disengaging equipment 35 with piping infrastructure inlet 11 and outlet 12 respectively, and (c) hydraulic lift system comprising four interconnected hydraulic lift units 40, each unit 40 mounted on the floor of vault 10 under each corner of service module 20.

When engaged with a piping infrastructure as shown in FIGS. 1, 2, and 3, frame rails 30 of self-extracting service module 20 rest on support stands 39. The first remote pipe coupling system 21 is detachably engaged at one end to connector pipe portion 36 of piping infrastructure inlet 11 and at the other end, is interconnected to main strainer 37. The second remote pipe coupling system 21 is detachably engaged at one end to connector pipe portion 36 of piping infrastructure outlet 12, and at the other end, interconnected to pressure-reducing valve 38. Piping infrastructure inlet 11 and outlet 12 are also connected by by-pass piping 13. Those skilled in the art will understand that isolation valves 15 must be installed between by-pass piping 13 and remote pipe coupling systems 21, and that by-pass piping 13 will be equipped with requisite pressure-regulating devices (not shown) for maintaining the flow of media while equipment 35 is disengaged from the piping infrastructure.

In this embodiment, each hydraulic lift unit 40 is secured to concrete vault 10 by floor mount 41 and top mount 42. Travelling plate 45 secures frame rail 30 of service module 20 to hydraulic lift unit 40. Each hydraulic lift unit 40 contains an extendible member 43. Increasing hydraulic pressure in lift units 40 cause extendible members 43 to move upward along guide/support members 44 thereby raising service module 20, while reducing hydraulic pressure in lift units 40 causes the weight of service module 20 and equipment 35 mounted thereon to compress extendible members 43 thereby lowering service module 20 until it rests on support stands 39. The hydraulic pressure for pressuring actuators 40 in this example is supplied by feed lines 16a-16b tapped into by-pass piping 13. Those skilled in this art will understand that a piping infrastructure (not shown) interconnected with a control panel (not shown) is required to regulate the flow of media through feed lines 16a and 16b to and from hydraulic actuators 40.

Figure 4:
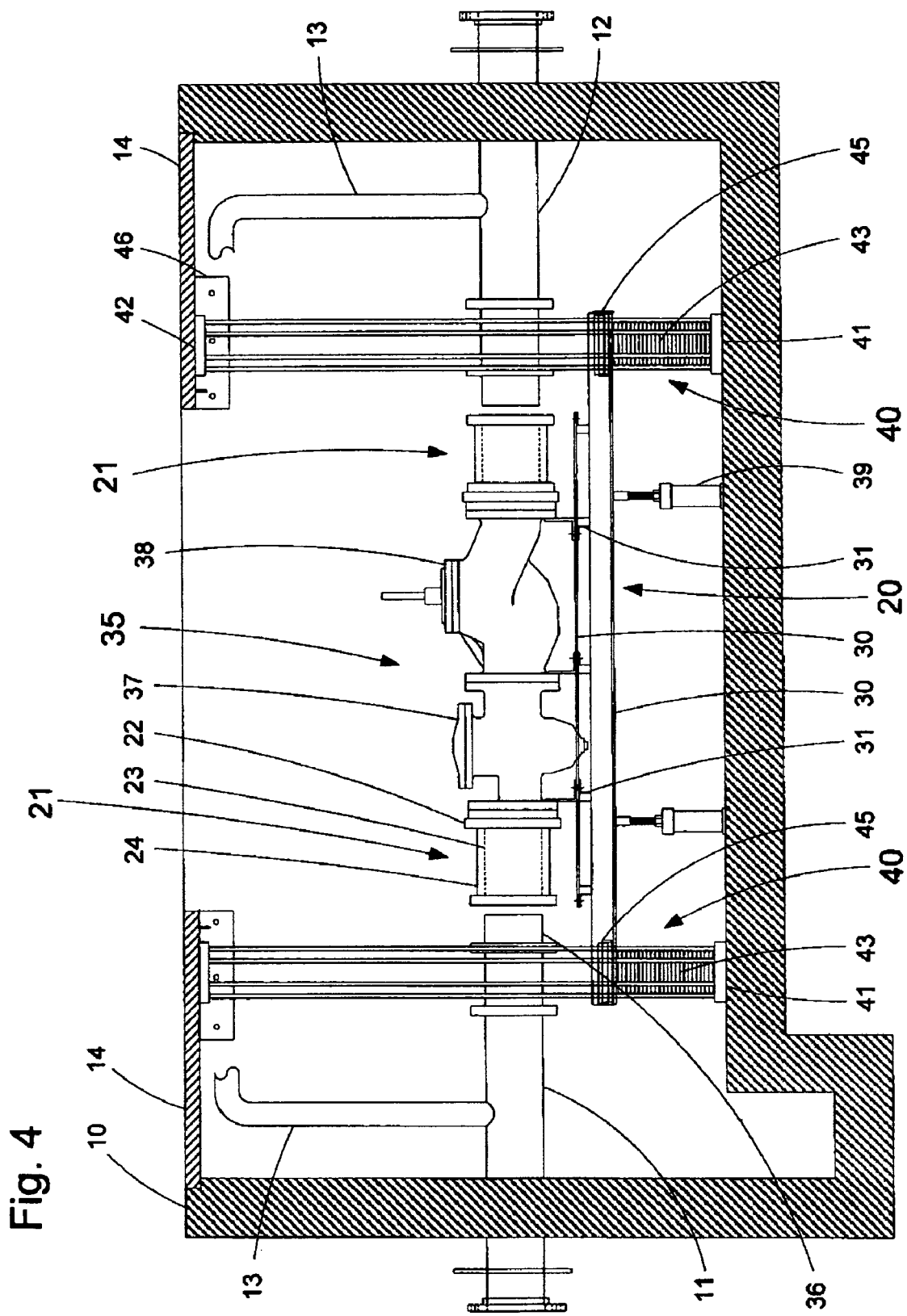
FIG. 4 is a side view of the embodiment of FIG. 1 shown disengaged from a piping infrastructure.
Figure 5:
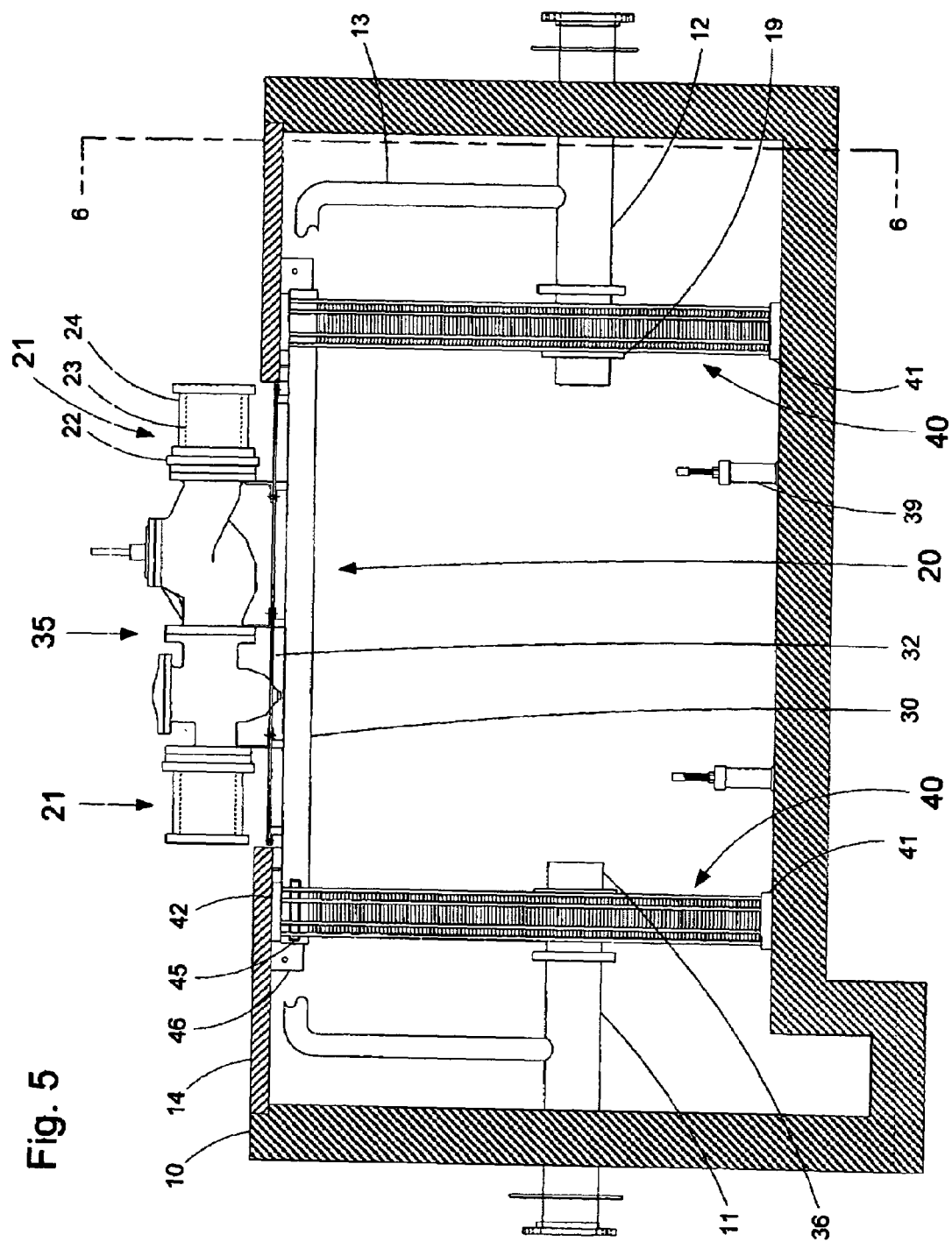
FIG. 5 is a side view of the embodiment of FIG. 1 shown in an elevated position above the piping infrastructure.
Figure 6:
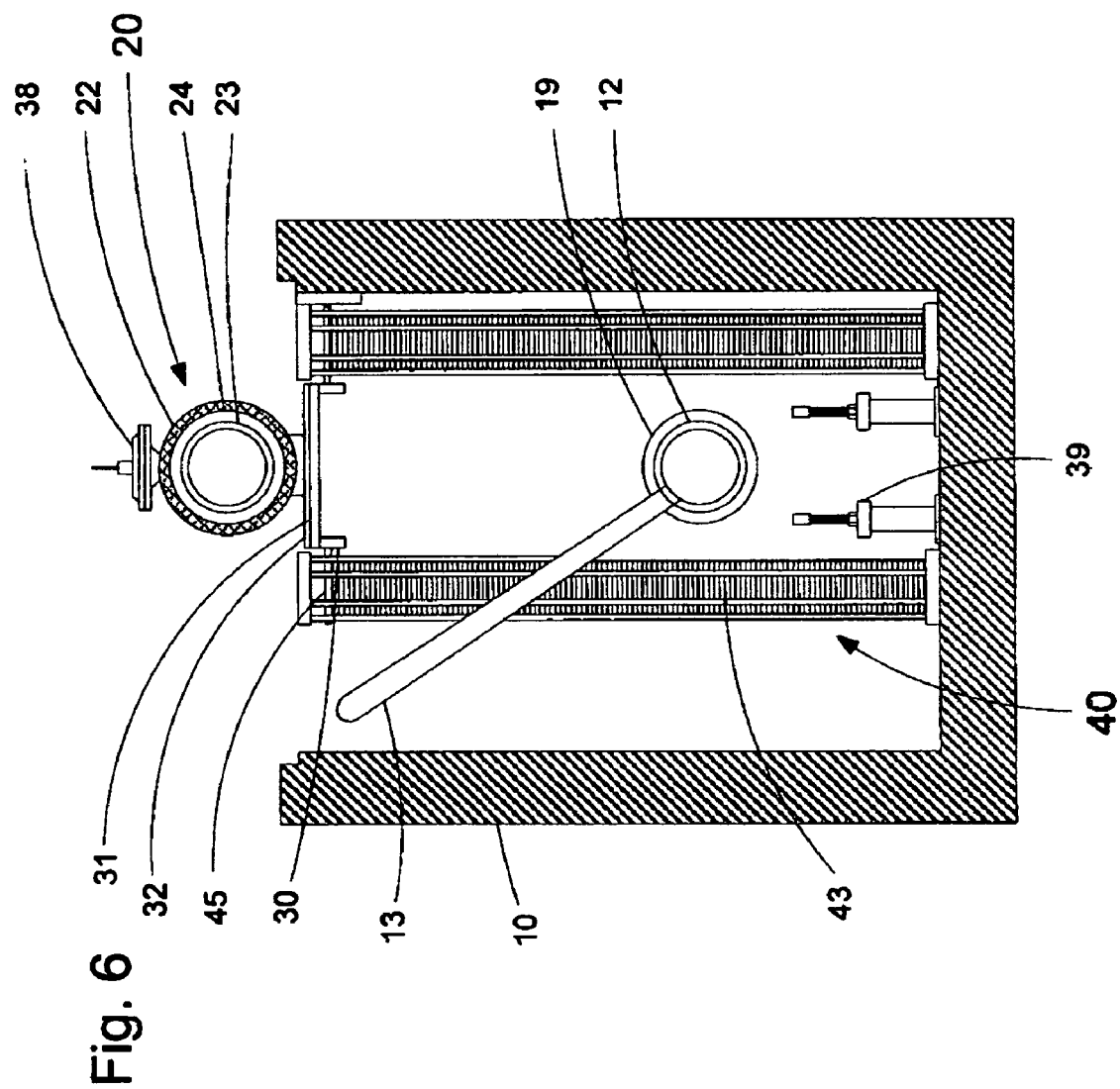
FIG. 6 is an end view of the embodiment shown in FIG. 5.
Figure 7:
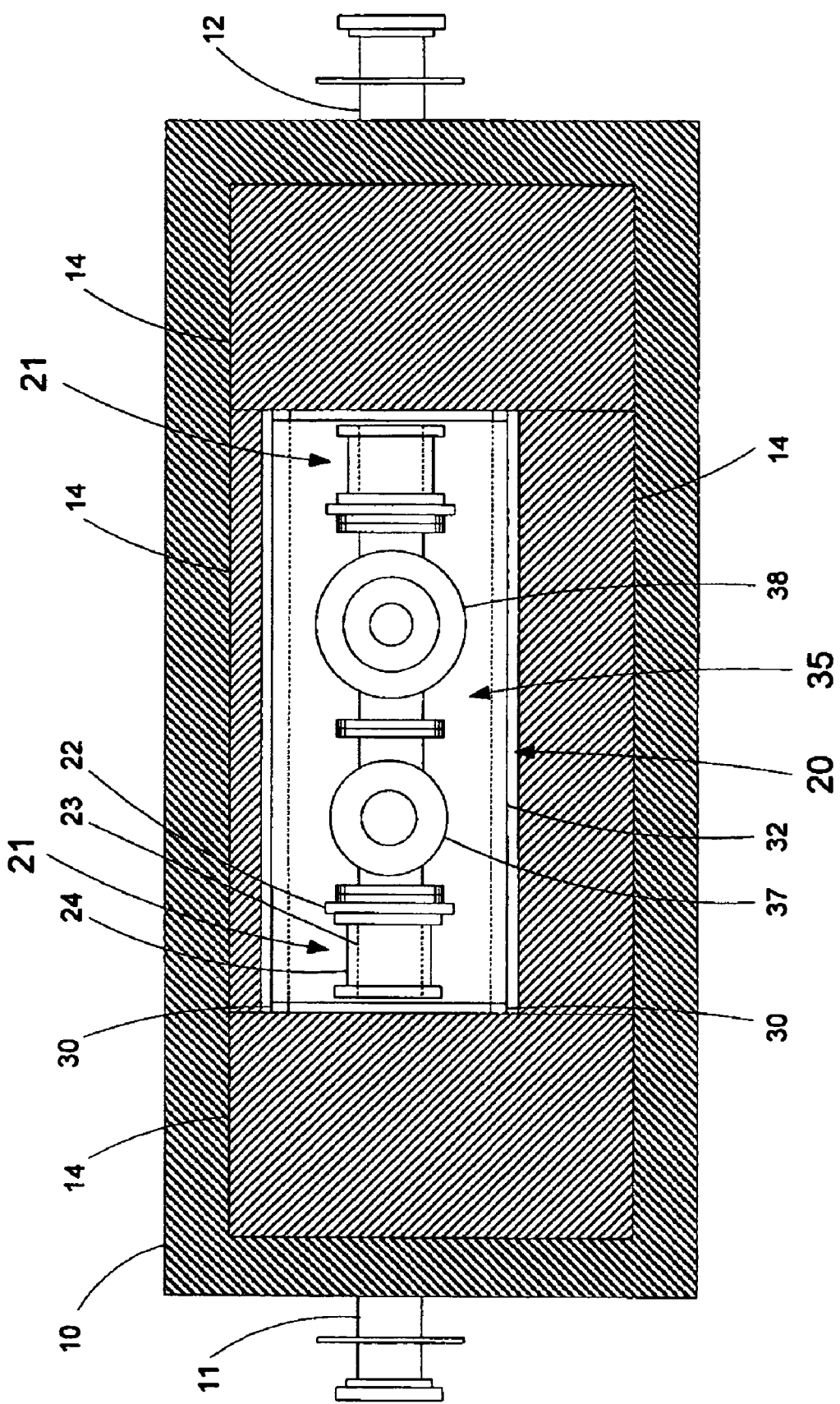
FIG. 7 is a plan view of the embodiment shown in FIG. 5.

When service work is required on equipment 35, self-extracting service module 20 is disengaged from the piping infrastructure by remotely manipulating pipe coupling systems 21 whereby they are first loosened from an engaged position shown by coupling system 21 engaged with inlet 11 in FIG. 3, then slidably retracted from piping infrastructure outlet 11 to a disengaged position as shown by coupling system 21a in FIG. 3. This can be achieved by means of elongated tools (not shown) that can be manipulated from outside the vault 10 through the open manhole. When both pipe coupling systems 21 are disengaged as shown in FIG. 4, then service module 20 may be raised by concurrently applying hydraulic line pressure to interconnected lift units 40 thereby causing the extendible members 43 to move upwards in unison along guide/support members 44 thereby raising metal platform 32 from within concrete vault 10 to a position where metal platform 32 is approximately level with the top of concrete vault 10 thereby making equipment 35 readily accessible at ground level as shown in FIGS. 5, 6 and 7 without the worker space constraints and hazards attendant within the confines of concrete vault 10. Personnel can easily access equipment configuration 35 from all sides by standing on treadplates 14. Treadplates 14 can be removable or alternatively, attached by hinges (not shown) to the top of vault 10. While those skilled in the art will understand that a variety of actuators may be selected for use with the self-extracting service model of the present invention, it is preferred to use a low-pressure actuator of the type described in U.S. Pat. No. 6,299,443, the disclosure of which is incorporated herein by reference.

In this example, first remote pipe coupling system 21 comprises a coupling engagement plate 22 sealably interconnected with strainer valve 37. Coupling control plate 22 is provided with coupling collar 23 having an outside diameter selected to match the outside diameter of connector piping portion 36 on piping infrastructure inlet 11. Coupling collar 23 is fitted with a controllably slidable and compressible coupling sleeve 24. The inner diameter of coupling sleeve 24 is selected to slidingly engage the outside diameters of coupling collar 23 and connector piping portion 36. Coupling engagement plate 22 is provided with means for affecting engagement and disengagement of pipe coupling system 21 with connector piping portion 36 whereby coupling engagement plate 22 may be remotely manipulated to first, slide coupling sleeve 24 over coupling collar 23 and connector piping 36 until it abuts spool 19, and then compressed to provide a leak-proof seal. The means for affecting engagement and disengagement of pipe coupling system 21 may be an elongate mechanical tool (not shown) having one end adapted for engaging plate 22 and the other end having a handle portion. The compression/release of the slide coupling sleeve 24 may likewise be operated by an elongated tool having a wrench socket at one end and a handle at the other. The wrench socket may be used to tighten or loosen bolts that compress the sleeve 24 to grip or release the coupling collar 23 and the piping portion 36. An example of such a system is disclosed in pending U.S. patent application Ser. No. 10/926,328 filed Aug. 26, 2004 by Fred M. Tadros, the disclosure of which is specifically incorporated herein by reference. Alternatively, the engagement/disengagement means and the compression/release means may incorporate electric motors that loosen the bolts and slide the coupling sleeve as required. The motors may be electrically or electronically controlled from a remote location outside the vault, and may be battery-powered, wired to an electrical supply, or powered by a removable wand carrying an electrical cable. As shown in FIG. 3, coupling engagement plate 22a may be remotely manipulated to first decompress coupling sleeve 24a from coupling collar 23a and connector piping 36a, then controllably sliding coupling sleeve 24a toward pressure-reducing valve 38 thereby completely releasing/freeing equipment configuration 35 to enable vertical movement of service module 20 as shown in FIGS. 5 and 6, thereby extracting service module 20 from within vault 10 and raising it to ground level for service work. Those skilled in this art will understand that isolation valves 15 are required between pipe coupling systems 21 and by-pass piping 13, and that isolation valves 15 must be closed before remote pipe coupling systems 21 are disengaged from connector piping portions 36. When isolation valves 15 are in closed positions, media moving through the piping infrastructure will be routed through by-pass piping 13 around equipment 35 mounted on service module 20.

The self contained service station unit containing herein the self-extracting service module provided by the present invention may be constructed and assembled off-site, and then delivered to the service station location for subsurface installation within subterranean piping infrastructures. Such service station units can be considerably smaller than conventional units containing therein similar requisite equipment configurations for regulating and/or monitoring the flow of liquid or gaseous media therethrough.

If so desired, the self-extracting service module of the present invention can be retrofitted into existing service stations to enable the raising of equipment configurations to surface ground level for service work there by avoiding the hazards and constraints of performing such work in confined spaces.

While this invention has been described with respect to the preferred embodiments, it is to be understood that various alterations and modifications can be made to components of the self-extracting service module for piping infrastructures within the scope of this invention, which are limited only by the scope of the appended claims.

What is claimed is:

1. A self-extracting service module apparatus for piping infrastructures used for transporting media, the apparatus comprising:
    equipment for controlling a flow of media therethrough, the equipment having an inlet and an outlet;
    a movable platform supporting said equipment;
    a first remote-controllable pipe coupling/de-coupling device interconnected with the equipment inlet and a second remote-controllable pipe coupling/de-coupling device interconnected with the equipment outlet; and
    a plurality of actuators acting on said platform, said actuators being operable to move said platform back and forth along an axis when said first and second remote-controllable devices are de-coupled from said inlet and said outlet.

2. The apparatus of claim 1 wherein the equipment is adapted for controlling liquid media.

3. The apparatus of claim 2 wherein the equipment is adapted for controlling said media selected from a group consisting of water, reagent, product, waste stream, and sewage.

4. The apparatus of claim 1 wherein the equipment is adapted for controlling gaseous media.

5. The apparatus of claim 1 wherein the movable platform is provided with a supporting substructure.

6. The apparatus of claim 5 wherein the substructure comprises frame rails integrally engaged with the platform.

7. The apparatus of claim 5 wherein the substructure comprises framerails integrally engaged with a plurality of crossmembers, the crossmember integrally engaged with the platform.

8. The apparatus of claim 1 wherein the actuators are pressure-operated devices wherein each device is provided with a moveable member that extends along a linear axis when pressure is increased and is retractable when pressure is decreased.

9. The apparatus of claim 8 wherein the pressure-operated device is a hollow flexible axially expandable bladder mounted within a rigid frame whereby increasing pressure within the bladder causes the moveable member to extend along a liner axis within the rigid frame.

10. The apparatus of claim 8 wherein the pressure is selected from a group consisting of hydraulic pressure, pneumatic pressure and mechanical pressure.

11. The apparatus of claim 8 wherein the pressure is provided by media drawn from the piping infrastructure, said drawn media controllably circulated to the actuators.

12. The apparatus of claim 1 wherein the actuators are mounted within a supporting substructure.

13. The apparatus of claim 1 wherein the actuators move the platform mounted thereto within the substructure, back and forth along a vertical axis.

14. The apparatus of claim 12 wherein the substructure is a concrete vault provided with a piping infrastructure inlet and an outlet, the vault provided with a removable top.

15. The apparatus of claim 1 wherein the actuators move the platform mounted thereto within the substructure, back and forth along a horizontal axis.

16. The apparatus of claim 15 wherein the platform is mounted onto a plurality of wheels for rolling along a track integrally connected to the substructure.

17. The apparatus of claim 1 wherein the remote-controllable pipe coupling device comprises a coupling control plate provided with a collar portion having an outside diameter matching the outside diameter of the piping infrastructure inlet, a slidable compressible sleeve portion superposed over the collar portion, a first device for remotely manipulating said sleeve portion to slidingly superpose a portion of the piping infrastructure inlet and a portion of the collar portion, and a second device for sealably compressing said sleeve portion onto the inlet and the collar portion.

18. The apparatus of claim 17 wherein the collar portion has an outside diameter matching the outside diameter of the piping infrastructure outlet.

19. The apparatus of claim 17 wherein the collar portion is provided with an integral guide for moving said sleeve portion therealong.

20. The apparatus of claim 17 wherein the piping infrastructure inlet and outlet are each provided with a spool for abutting the sleeve portion thereagainst for coupling therewith.

21. The apparatus of claim 17 wherein the first device is a hand-operated tool selected from a group consisting of mechanical tools, hydraulic tools and pneumatic tools.

22. The apparatus of claim 17 wherein the second device is a hand operated tool selected from a group consisting of mechanical tools, hydraulic tools and pneumatic tools.

23. The apparatus of claim 1 wherein the equipment is adapted for controlling gaseous media.

24. The apparatus of claim 1 wherein the movable platform is provided with a supporting substructure.

25. The apparatus of claim 24 wherein the substructure comprises frame rails integrally engaged with the platform.

26. The apparatus of claim 24 wherein the substructure comprises framerails integrally engaged with a plurality of crossmembers, the crossmember integrally engaged with the platform.

27. A service station assembly for regulating the flow of liquid media within a piping infrastructure; the assembly comprising:
a vault;
equipment for controlling the flow of media therethrough, the equipment having an inlet and an outlet;
a movable platform supporting said equipment;
a first remote-controllable pipe coupling/de-coupling device interconnected with the equipment inlet and a second remote-controllable pipe coupling/de-coupling device interconnected with the equipment outlet; and
a plurality of actuators acting on said platform, said actuators being operable to move said platform back and forth along an axis when said first and second remote-controllable devices are de-coupled from said inlet and said outlet.

28. The apparatus of claim 27 wherein the equipment is adapted for controlling liquid media.

29. The apparatus of claim 28 wherein the equipment is adapted for controlling said media selected from a group consisting of water, reagent, product, waste stream, and sewage.

30. The apparatus of claim 27 wherein the actuators are pressure-operated devices wherein each device is provided with a moveable member that extends along a linear axis when pressure is increased and is retractable when pressure is decreased.

31. The apparatus of claim 30 wherein the pressure-operated device is a hollow flexible axially expandable bladder mounted within a rigid frame whereby increasing pressure within the bladder causes the moveable member to extend along a liner axis within the rigid frame.

32. The apparatus of claim 30 wherein the pressure is selected from a group consisting of hydraulic pressure, pneumatic pressure and mechanical pressure.

33. The apparatus of claim 30 wherein the pressure is provided by media drawn from the piping infrastructure, said drawn media controllably circulated to the actuators.

34. The apparatus of claim 23 wherein the actuators are mounted within a supporting substructure.

35. The apparatus of claim 23 wherein the actuators move the platform mounted thereto within the substructure, back and forth along a vertical axis.

36. The apparatus of claim 34 wherein the substructure is a concrete vault provided with a piping infrastructure inlet and an outlet, the vault provided with a removable top.

37. The apparatus of claim 23 wherein the actuators move the platform mounted thereto within the substructure, back and forth along a horizontal axis.

38. The apparatus of claim 37 wherein the platform is mounted onto a plurality of wheels for rolling along a track integrally connected to the substructure.

39. The apparatus of claim 23 wherein the remote-controllable pipe coupling device comprises a coupling control plate provided with a collar portion having an outside diameter matching the outside diameter of the piping infrastructure inlet, a slidable compressible sleeve portion superposed over the collar portion, a first device for remotely manipulating said sleeve portion to slidingly superpose a portion of the piping infrastructure inlet and a portion of the collar portion, and a second device for sealably compressing said sleeve portion onto the inlet and the collar portion.

40. The apparatus of claim 39 wherein the collar portion has an outside diameter matching the outside diameter of the piping infrastructure outlet.

41. The apparatus of claim 39 wherein the collar portion is provided with an integral guide for moving said sleeve portion therealong.

42. The apparatus of claim 39 wherein the piping infrastructure inlet and outlet are each provided with a spool for abutting the sleeve portion thereagainst for coupling therewith.

43. The apparatus of claim 39 wherein the first device is a hand-operated tool selected from a group consisting of mechanical tools, hydraulic tools and pneumatic tools.

44. The apparatus of claim 39 wherein the second device is a hand operated tool selected from a group consisting of mechanical tools, hydraulic tools and pneumatic tools.

* * * * *